United States Patent
Chang et al.

(10) Patent No.: US 10,554,801 B2
(45) Date of Patent: Feb. 4, 2020

(54) MESSAGE TRANSFER SYSTEM INCLUDING DISPLAY DEVICE AND MOBILE DEVICE AND MESSAGE TRANSFER METHOD THEREOF

(71) Applicant: SAMSUNG ELECTRONICS CO., LTD., Suwon-si (KR)

(72) Inventors: Il-ku Chang, Seongnam-si (KR); Sang-hyun Park, Hwaseong-si (KR); Sang-gon Song, Suwon-si (KR); Su-jin Yeon, Seoul (KR); Young-kyu Jin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 570 days.

(21) Appl. No.: 15/294,811

(22) Filed: Oct. 17, 2016

(65) Prior Publication Data
US 2017/0034326 A1 Feb. 2, 2017

Related U.S. Application Data

(63) Continuation of application No. 14/146,295, filed on Jan. 2, 2014, now Pat. No. 9,497,146.

(30) Foreign Application Priority Data

Jan. 2, 2013 (KR) .................. 10-2013-0000322
Feb. 4, 2013 (KR) .................. 10-2013-0012155

(51) Int. Cl.
*G06F 3/048* (2013.01)
*H04M 1/60* (2006.01)
(Continued)

(52) U.S. Cl.
CPC ........ *H04M 1/6075* (2013.01); *G06F 3/0484* (2013.01); *H04L 51/046* (2013.01);
(Continued)

(58) Field of Classification Search
CPC .. H04L 51/046; G06F 3/0484; H04M 1/6075; H04M 1/72552
(Continued)

(56) References Cited

U.S. PATENT DOCUMENTS 8,831,571 B2 9/2014 Riffe
9,065,928 B2 6/2015 Huang et al.
(Continued)

FOREIGN PATENT DOCUMENTS

| CN | 102075853 A | 5/2011 |
| CN | 102625241 A | 8/2012 |
| EP | 2 053 881 A1 | 4/2009 |

OTHER PUBLICATIONS

Communication dated May 23, 2014 issued by the European Patent Office in counterpart European Patent Application No. 13198469.2.
(Continued)

*Primary Examiner* — David Phantana-angkool
(74) *Attorney, Agent, or Firm* — Sughrue Mion, PLLC

(57) ABSTRACT

A display device is provided, which includes a memory which stores a plurality of templates which are differently set according to kinds of messages, a detector which detects different pieces of status information, a display which displays a message transfer screen, a controller which automatically generates a message through combination of at least one of the plurality of templates and at least one of the different pieces of status information, which respectively correspond to a selected kind of message, when the kind of message to be transferred is selected on the message transfer screen, and a communicator which transfers the message to an external device. Accordingly, the display device can conveniently transfer the generated message.

18 Claims, 15 Drawing Sheets

(51) Int. Cl.
*H04L 12/58* (2006.01)
*G06F 3/0484* (2013.01)
*H04M 1/725* (2006.01)
*G01C 21/36* (2006.01)

(52) U.S. Cl.
CPC ..... *H04M 1/7253* (2013.01); *H04M 1/72552* (2013.01); *G01C 21/3691* (2013.01); *H04M 1/72566* (2013.01); *H04M 1/72572* (2013.01)

(58) Field of Classification Search
USPC .......................................................... 715/752
See application file for complete search history.

(56) References Cited

U.S. PATENT DOCUMENTS

| | | | |
|---|---|---|---|
| 9,066,199 | B2 | 6/2015 | Forstall et al. |
| 9,308,892 | B2 | 4/2016 | Schwarz et al. |
| 9,357,368 | B2 | 5/2016 | Nelson et al. |
| 9,358,940 | B2 | 6/2016 | Cooper et al. |
| 9,384,609 | B2 | 7/2016 | Ricci |
| 9,779,562 | B1* | 10/2017 | Cook .................. G07C 5/0808 |
| 9,930,158 | B2* | 3/2018 | Basir .................. H04M 1/6091 |
| 10,198,877 | B1* | 2/2019 | Maltsev ................. G07C 5/006 |
| 10,234,302 | B2* | 3/2019 | Singhal ............. G01C 21/3602 |
| 10,286,915 | B2* | 5/2019 | Xiao ..................... B60W 40/09 |
| 2005/0170869 | A1 | 8/2005 | Slemmer et al. |
| 2006/0156209 | A1 | 7/2006 | Matsuura et al. |
| 2007/0249406 | A1 | 10/2007 | Andreasson |
| 2008/0207173 | A1* | 8/2008 | Jendbro ............ H04M 1/72552 455/412.1 |
| 2009/0248820 | A1 | 10/2009 | Basir et al. |
| 2010/0246791 | A1 | 9/2010 | Wang et al. |
| 2011/0087743 | A1 | 4/2011 | Deluca et al. |
| 2011/0087744 | A1 | 4/2011 | Deluca et al. |
| 2012/0050028 | A1 | 3/2012 | Mastronardi et al. |
| 2012/0135714 | A1 | 5/2012 | King, II |
| 2013/0099892 | A1 | 4/2013 | Tucker et al. |
| 2014/0066132 | A1 | 3/2014 | Burke et al. |
| 2014/0067152 | A1 | 3/2014 | Swanson et al. |
| 2014/0118168 | A1 | 5/2014 | Lee et al. |
| 2015/0234580 | A1 | 8/2015 | Secord et al. |

OTHER PUBLICATIONS

Communication dated Dec. 10, 2018, issued by the Korean Intellectual Property Office in counterpart Korean Patent Application No. 10-2013-0012155.
Communication dated Mar. 6, 2018, issued by the European Patent Office in counterpart European Patent Application No. 17187426.6.
Communication dated Oct. 31, 2017, issued by the State Intellectual Property Office of P.R. China in counterpart Chinese Application No. 201410001415.0.

* cited by examiner

Location : Kangnam Station
Speed : 60km
Weather : Cloudy
Song : DoremiSong
Arrive Time : 06:00 PM
Temperature : 14°C

FIG. 7
(a)
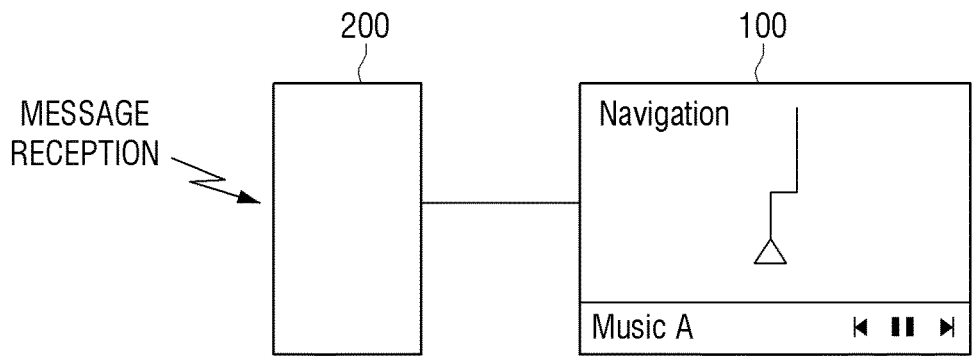
(b)
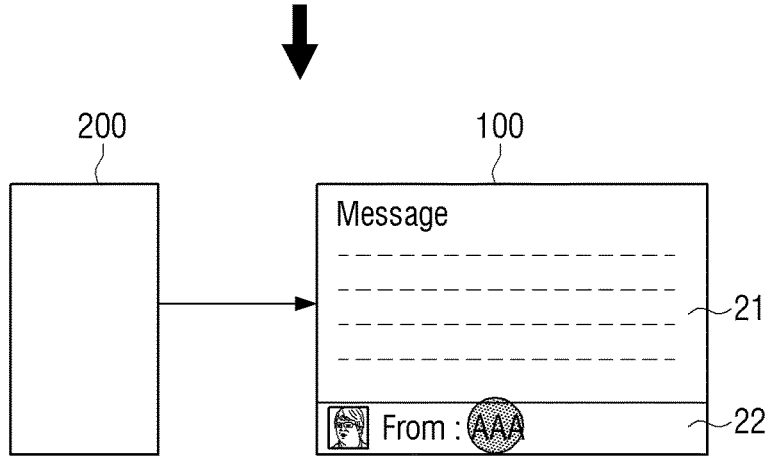
(c)
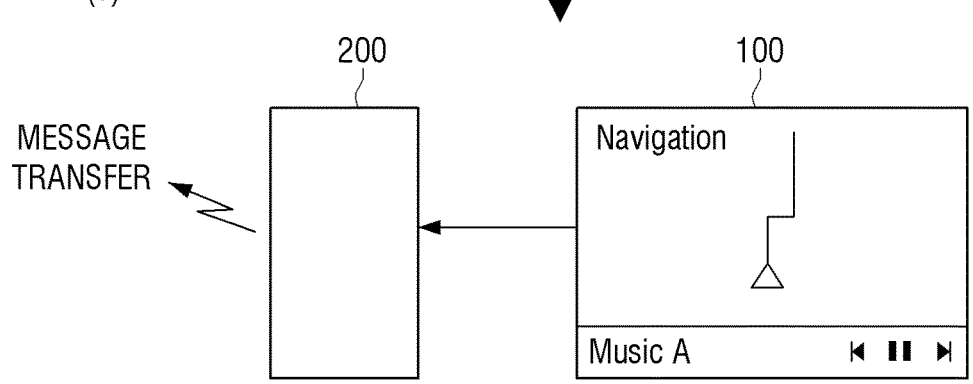

FIG. 8
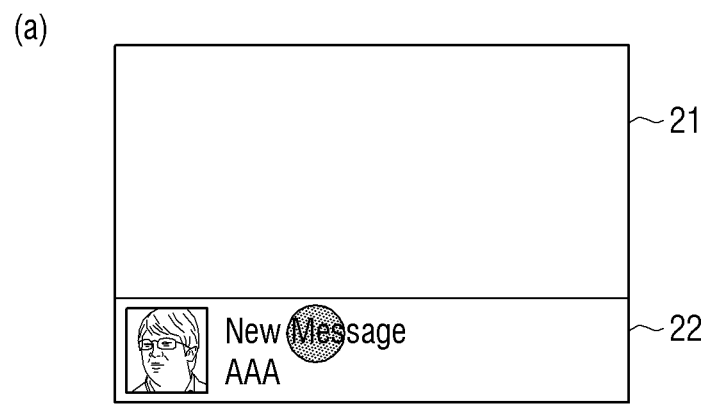
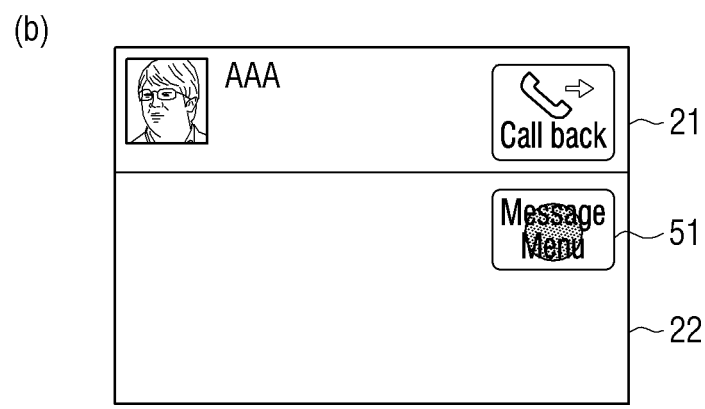
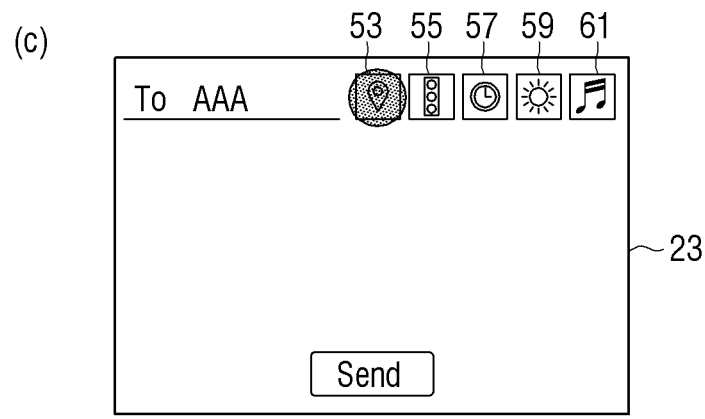

FIG. 9
(a) 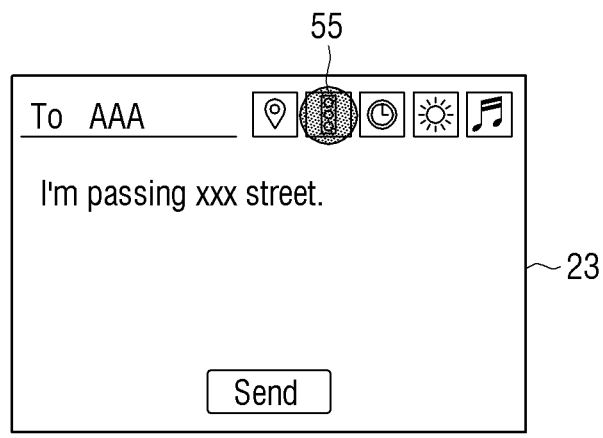
(b) 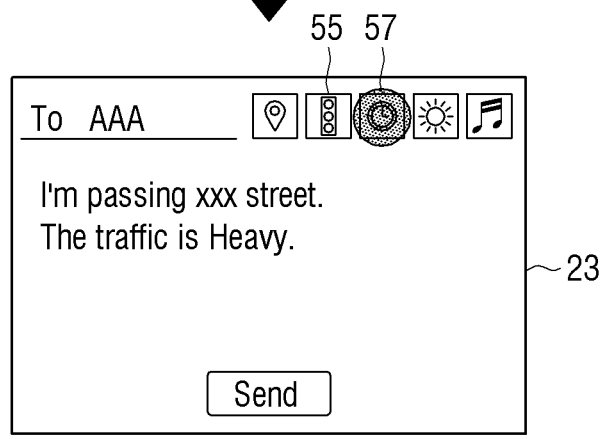
(c) 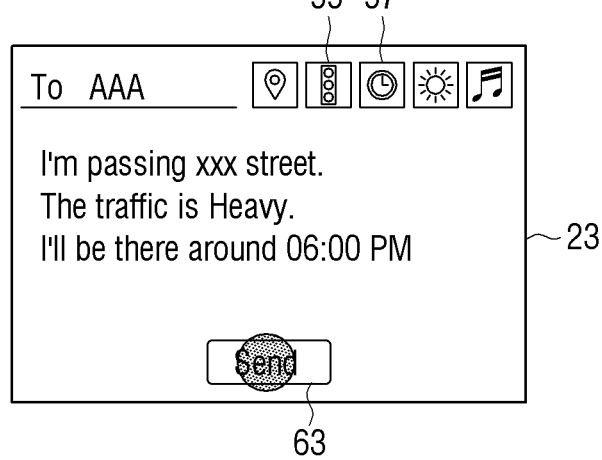

FIG. 10
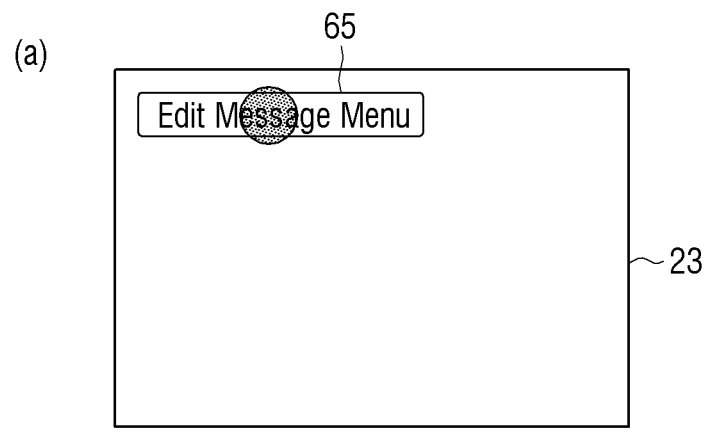
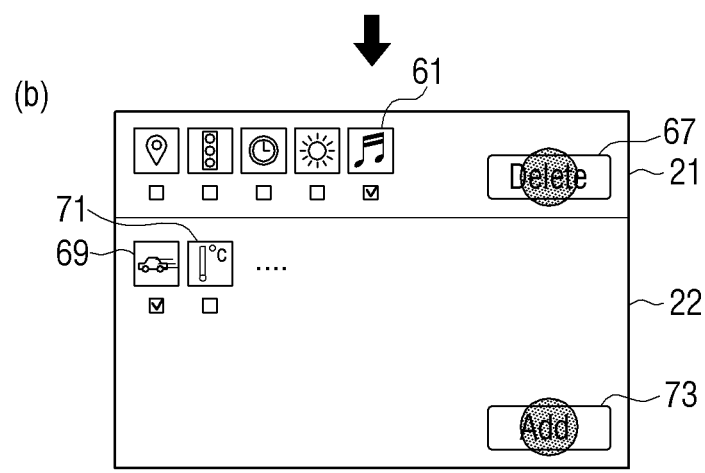
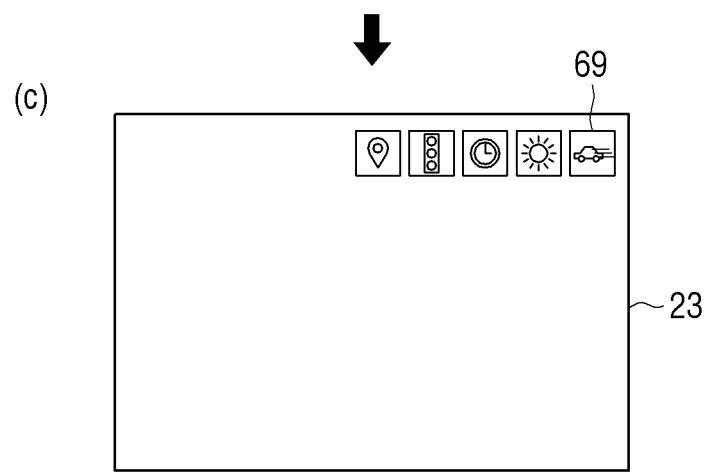

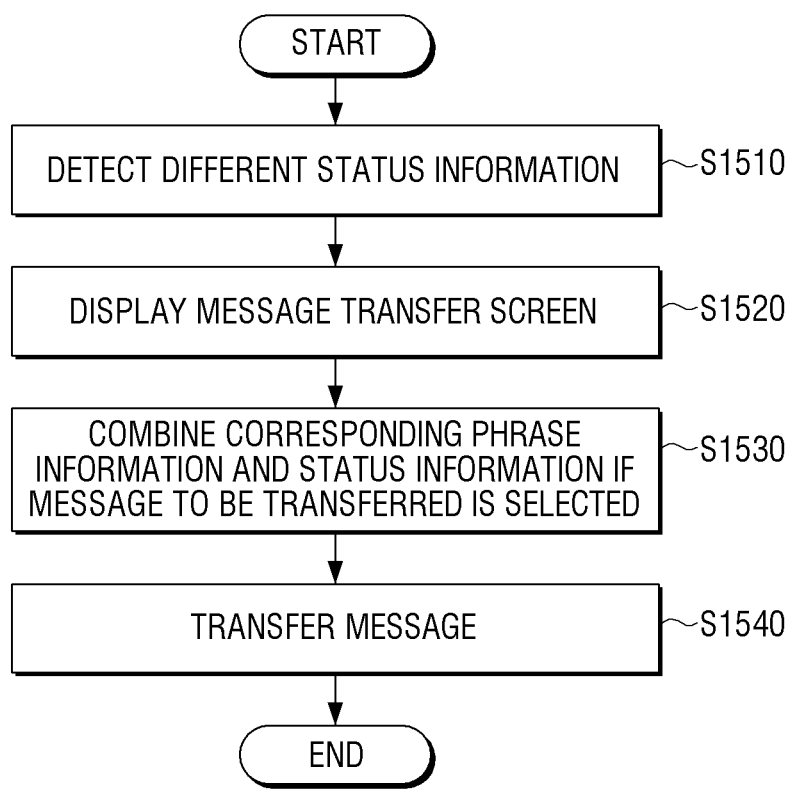

MESSAGE TRANSFER SYSTEM INCLUDING DISPLAY DEVICE AND MOBILE DEVICE AND MESSAGE TRANSFER METHOD THEREOF

PRIORITY

This application is a continuation of application Ser. No. 14/146,295, filed Jan. 2, 2014, which claims priority from Korean Patent Application No. 10-2013-0000322, filed on Jan. 2, 2013 and No. 10-2013-0012155, filed on Feb. 4, 2013, in the Korean Intellectual Property Office, the disclosures of which are incorporated herein by reference in their entirety.

BACKGROUND OF THE INVENTION

1. Field of the Invention

Apparatuses and methods consistent with exemplary embodiments relate to providing a message transfer system including a display device, a mobile device, and a message transfer method thereof, and more particularly to providing a message transfer system including a display device, a mobile device, and a message transfer method thereof, which can conveniently transfer a message through acquisition of information related to a current state.

2. Description of the Related Art

Recently, with the growth of communication technology and electronic device technology, various portable communication devices and display devices have been developed. Many people possess personal portable communication devices, and display devices that perform various functions have been installed in many vehicles.

In the case of communication devices, even if the technology is further developed, phone calls and text messages are some of the primary methods to transfer information to another party. Further, phone calls, text messages, and web search are some of the primary methods to receive information.

In particular, a primary method that is used to conveniently transfer information to another party is text message transfer. However, for such text message transfer, a text input process is necessary to prepare a phrase. In special situations, such as driving a car, such a text input process may be dangerous. Furthermore, mistyping may occur during the text input process. Although the size of the display of portable communication devices has become larger, it is relatively smaller than those of other display devices due to the characteristic of the portable device itself. Accordingly, in order to perform text input through such a relatively small screen, it is necessary for a user to concentrate his/her attention thereon, and this may cause inconvenience in use and danger in the special situations.

In order to solve the above-described problem, technology to transfer text by voice recognition has been researched. However, a user's voice is often not completely recognized or is not completely converted into text.

Accordingly, there is a need for technology that enables a user to conveniently send a text message using the display device.

SUMMARY OF THE INVENTION

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a message transfer system including a display device, a mobile device, and a message transfer method thereof, which can conveniently transfer a message through acquisition of current status information of the user.

According to an aspect of an exemplary embodiment, there is provided a display device includes a memory configured to store a plurality of templates which are differently set according to kinds of messages; a detector configured to detect different pieces of status information; a display configured to display a message transfer screen; a controller configured to automatically generate a message through combination of at least one of the plurality of templates and at least one of the different pieces of status information, which respectively correspond to a selected kind of message, when the kind of message to be transferred is selected on the message transfer screen; and a communicator configured to transfer the generated message to an external device.

The plurality of templates can be configured to be updated according to a user operation.

The kinds of messages may include at least one of a first message for notifying of location information of the display device, a second message for notifying of traffic status information, a third message for notifying of estimated arrival time information, a fourth message for notifying of weather information, and a fifth message for notifying of content information that is reproduced through the display device, and the status information may include at least one of the location information of the display device, the traffic status information, the estimated arrival time information, the weather information, and the content information that is reproduced through the display device.

The kinds of messages can be configured to be edited according to a user operation.

The controller may be configured to control the communicator to transfer call details and location information of the display device to a server when a phone call is made.

According to an aspect of another exemplary embodiment, there is provided a message transfer method of a display device includes detecting different pieces of status information; displaying a message transfer screen; automatically generating a message through combination of one of a plurality of stored templates that are differently set according to kinds of messages and at least one of the different pieces of status information, which respectively correspond to a selected kind of message, when the kind of message to be transferred is selected on the message transfer screen; and transferring the generated message to an external device.

The plurality of stored templates can be updated according to a user operation.

The kinds of messages may include at least one of a first message for notifying of location information of the display device, a second message for notifying of traffic status information, a third message for notifying of estimated arrival time information, a fourth message for notifying of weather information, and a fifth message for notifying of content information that is reproduced through the display device, and the status information may include at least one of the location information of the display device, the traffic status information, the estimated arrival time information, the weather information, and the content information that is reproduced through the display device.

The kinds of messages can be edited according to a user operation.

The message transfer method according to the aspect of the present disclosure may further include transferring call details and location information of the display device to a server when a phone call is made.

According to an aspect of another exemplary embodiment, there is provided a message transfer system including a mobile device and a display device, including the mobile device configured to transfer a received message and sender information to the display device; and the display device configured to detect different pieces of status information, display a message transfer screen, automatically generate a message through combination of one of a plurality of stored templates that are differently set according to kinds of messages and at least one of the different pieces of status information, which respectively correspond to a selected kind of message, when the kind of message to be transferred is selected on the message transfer screen, and transfer the generated message to the mobile device so that the mobile device sends the message as the sender information, wherein the mobile device is configured to transfer the generated message as the sender information.

According to an aspect of another exemplary embodiment, there is provided a method of generating a message including: displaying vehicle information and other information on a display screen in a vehicle; storing template information that corresponds to each of the vehicle information and the other information; selecting, though a user input, at least one of the displayed vehicle information and the other information; and generating the message by combining the selected information and corresponding template information.

The method may further include transferring the generated message to an external device.

The external device may be a mobile device.

The message may be a short message service (SMS) message.

The vehicle information may include information generated by sensors in the vehicle.

The other information may include information from a mobile device.

As described above, according to the various exemplary embodiments, the message can be conveniently transferred based on the current status information of the user.

BRIEF DESCRIPTION OF THE DRAWINGS

The above and/or other aspects will be more apparent by describing certain exemplary embodiments with the accompanying drawings, in which:

FIG. 6 is a diagram illustrating current status information detected by a display device according to an exemplary embodiment;

FIG. 7 shows diagrams illustrating a message transfer/reception process according to an exemplary embodiment;

FIG. 8 and FIG. 9 show diagrams illustrating a message generation process in a display device according to an exemplary embodiment;

FIG. 10 shows diagrams illustrating a process of editing a message kind menu according to an exemplary embodiment;

FIG. 15 is a flowchart of a message transfer method of a display device according to an exemplary embodiment.

DETAILED DESCRIPTION OF EXEMPLARY EMBODIMENTS

Figure 1:
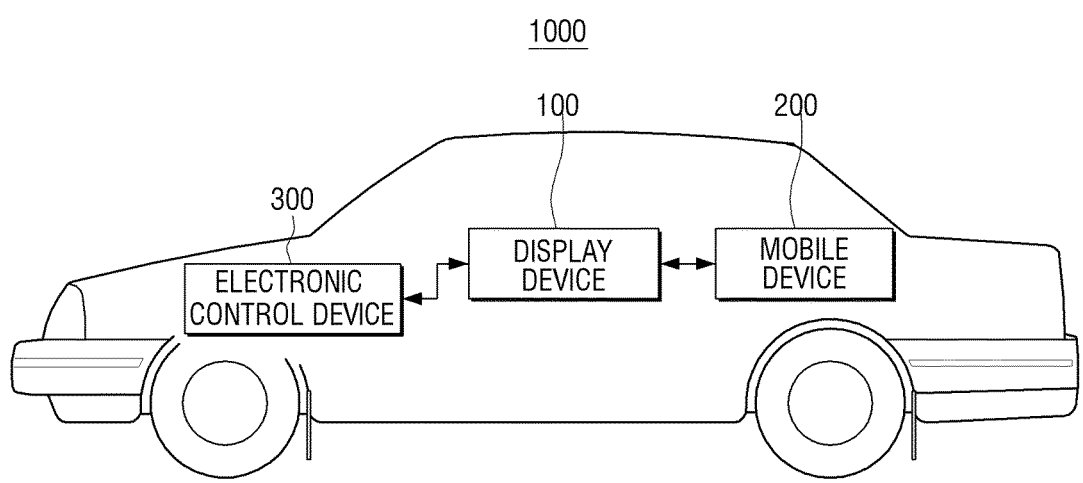
FIG. 1 is a diagram illustrating a message transfer system according to an exemplary embodiment.

Hereinafter, certain exemplary embodiments are described in greater detail with reference to the accompanying drawings.

In the following description, like drawing reference numerals are used for the same elements, even in different drawings. The matters defined in the following description, such as detailed construction and elements, are provided to assist in a comprehensive understanding of the exemplary embodiments. However, the exemplary embodiments can be practiced without those specifically defined maters. Well-known functions or constructions are not described in detail since they would obscure the exemplary embodiments with unnecessary detail. Also, the following terms are defined considering functions of the exemplary embodiments, and may be differently defined according to the intention of an operator or custom. Therefore, the terms should be defined based on the overall contents of the specification.

As used herein, expressions such as "at least one of," when preceding a list of elements, modify the entire list of elements and do not modify the individual elements of the list.

FIG. 1 is a diagram illustrating a message transfer system 1000 according to an exemplary embodiment.

Referring to FIG. 1, a message transfer system 1000 includes a display device 100, a mobile device 200, and an electronic control unit (ECU) 300.

The display device 100 may be built in a vehicle or may be detachably installed in the vehicle. For example, the display device 100 may be a head unit, a navigator, a tablet personal computer (PC), or a digital frame provided in the vehicle. The display device 100 may display various kinds of status information of the vehicle and control menus received from the electronic control unit 300, or may display applications transferred from the mobile device 200.

The mobile device 200 may be a mobile phone, a smart phone, or a personal digital assistant (PDA), which includes a cellular communication module (not illustrated). The cellular communication module is configured to connect to an external device (not illustrated) through a base station of a cellular system through at least one or plural antennas (not illustrated) using a wireless access technology according to a cellular communication protocol. The mobile device 200 transmits and receives a wireless signal that contains a voice call, a video call, or a message with another communicable device having an input phone number.

The electronic control unit 300 refers to an embedded system that controls at least one of an electrical system and a sub-system of the vehicle. The electronic control unit 300 may include an electrical/engine control module, a power train control module, a transfer control module, a brake control module, a central control module, a central timing control module, a general electronic module, a body control module, and a suspension control module. Accordingly, the electronic control unit 300 receives information from various kinds of sensors included in the vehicle and controls all parts of the vehicle, such as an auto-transmission, a driving system, a braking system, and a steering system.

The display device 100 may be connected to the mobile device 200 and the electronic control unit 300 using various communication methods. For example, the display device 100 may be connected to the mobile device 200 by wire using USB or the like. Further, the display device 100 may be wirelessly connected to the mobile device 200 using a near field communication system, such as Wi-Fi or Bluetooth™. The mobile device 200 that is connected to the display device 100 may transfer various kinds of data including received calls and messages to the display device 100. The display device 100 may store or display the various kinds of data transferred from the mobile device 200. Further, if a data transfer command is input from outside the display device, the display device 100 may send the corresponding data and a transfer command to the mobile device 200. The mobile device 200 may transfer the data received from the display device 100 to an external device according to the transfer command. The display device 100 and the mobile device 200 may transfer or receive mutual authority information, and may encrypt a message to be transferred. When transferring and receiving the data, the display device 100 or the mobile device 200 which has received the data may confirm the authority information and perform the corresponding operation, so that malfunction due to the other device or erroneous data transfer can be prevented.

The display device 100 may be connected to the electronic control unit 300. In an exemplary embodiment, the display device 100 and the electronic control unit 300 may be connected to each other by a CAN (Controller Area Network) method. The CAN will be described later. The electronic control unit 300 may be connected to the display device 100 and may transfer detected vehicle status information to the display device 100, and the display device 100 may display or store the transferred vehicle status information. Further, the display device 100 may display a vehicle control menu, and if a vehicle control command is input from a user, the display device 100 may transfer the input control command to the electronic control unit 300. For example, the user can perform a vehicle control, such as headlight on/off and indoor temperature setting, through the display device 100. The electronic control unit 300 that has received the control command may control the corresponding module.

With respect to a call command, a message transfer command, or a data transfer/reception command that is received from the display device 100, the mobile device 200 may connect to an external mobile device or a server and perform an operation corresponding to the received command.

Figure 2:
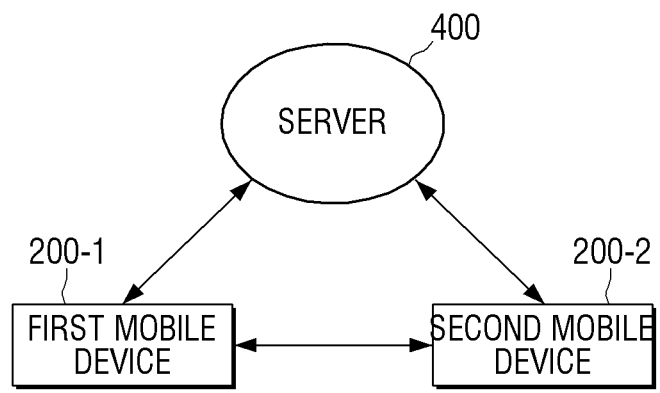
FIG. 2 is a diagram illustrating a system between a server and a mobile device according to an exemplary embodiment.

FIG. 2 is a diagram illustrating a system 2000 between a server and a mobile device according to an exemplary embodiment.

Referring to FIG. 2, first and second mobile devices 200-1 and 200-2 and a server 400 are illustrated.

As described above with reference to FIG. 1, the first and second mobile devices 200-1 and 200-2 include cellular communication modules (not illustrated). Accordingly, the first mobile device 200-1 and the second mobile device 200-2 are connected to each other using a wireless access technology according to a general cellular communication protocol. The first and second mobile devices 200-1 and 200-2 can perform voice calls, video calls, message transfers, and data transfers. The first and second mobile devices 200-1 and 200-2 may communicate with the server 400.

In the system illustrated in FIG. 2, various kinds of servers 400 may be provided according to various functions. The first and second mobile devices 200-1 and 200-2 may perform the same functions in relation to the server 400, and thus, hereinafter, the first and second mobile devices 200-1 and 200-2 will be described as the mobile device 200.

For example, in the case where the mobile device 200 requests weather information from the server 400, the server 400 may be a weather information server that stores weather information. In the case where the mobile device 200 request geographical information from the server 400, the server 400 may be a map data server that stores map-related data. In the case where the mobile device 200 request traffic information from the server 400, the server 400 may be a traffic information server that stores real-time traffic information. The server 400 may not be limited to performing one specific function, but may store various kinds of information. Further, in the case where the mobile device 200 requests information, the server 400 may search another server or a web and to transfer the requested information. As another example, the server 400 may not be a physically existing server, but may be a web, such as the Internet. Further, the server 400 may be a management server that generates a user profile corresponding to user information received from the mobile device 200 and stores user-related information.

For example, the mobile device 200 and the server 400 may be connected using a wireless LAN method, such as Wi-Fi.

As described above, the mobile device 200 may connect to another mobile device using the cellular communication method to transmit or receive voice calls or data, or may connect to a server using a wireless LAN method to transmit or receive data. Up to now, the message transfer system and the system between the server 400 and the mobile device 200 have been described. Hereinafter, a display device 100 and a mobile device 200, which are included in the message transfer system, will be described.

Figure 3:
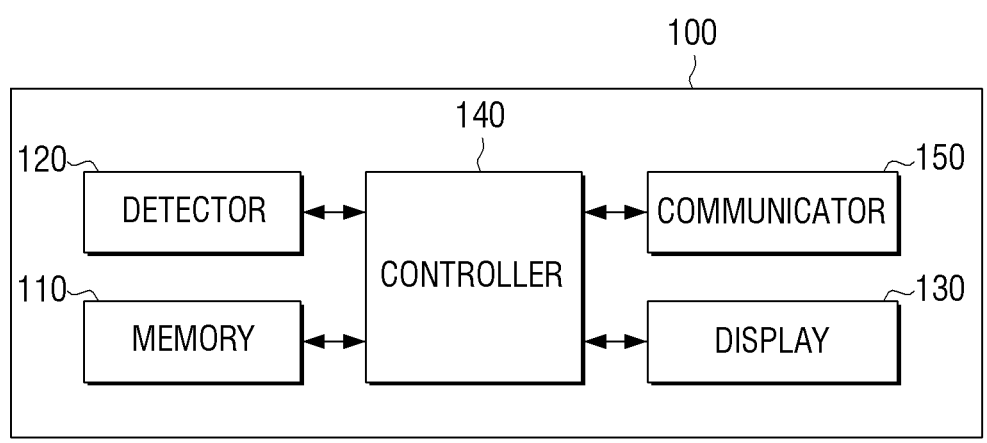
FIG. 3 is a block diagram of a display device according to an exemplary embodiment.

FIG. 3 is a block diagram of the display device according to an exemplary embodiment. Referring to FIG. 3, a display device 100 includes a memory 110, a detector 120, a display 130, a controller 140, and a communicator 150.

In the memory, a plurality of templates, which are differently set according to the kinds of messages, are stored. The kinds of messages refers to a category that is predetermined for the display device 100 to conveniently transfer messages. For example, the kinds of messages may include a first message for transferring location information of the display device 100, a second message for transferring traffic status information, a third message for transferring estimated arrival time information, a fourth message for transferring weather information, and a fifth message for transferring content information that is reproduced in the vehicle.

The content may be reproduced in the display device 100, the mobile device 200, or another content reproduction device (not illustrated) located in the vehicle. The kinds of message may include messages for transferring current user status, passenger boarding information, vehicle speed information, temperature information, and radio channel information that a user listens to.

The template refers to a prescribed form, and may include predetermined phrases and predetermined images.

The different templates are stored in the memory 110 to correspond to the kinds of messages. For example, a template "I'm passing" may be stored in relation to the location information, and a template "The traffic is" may be stored in relation to the traffic status information. A template "I'll be there around" may be stored in relation to the estimated arrival time information, and a template "Today is" may be stored in relation to weather information. Different templates are stored according to the kinds of messages, and one template may be stored to correspond to one message kind. The stored templates and the message kinds may be updated or edited according to a user operation. Further, the memory may store plural pieces of status information detected by the detector 120.

Further, if the display device makes a call, the memory may store call details to be transferred to the server 400. The display device may transfer the call details to the server 400 in real time without storing the call details.

The detector 120 detects different pieces of status information. The status information may refer to the location information of the display device 100, the traffic status information, the estimated arrival time information, the weather information, and the content information that is reproduced. Further, the status information may be current user status information, passenger boarding information, vehicle speed information, temperature information, and radio channel information that a user listens to. The location of the display device 100 may refer to a location that is detected through reception of a GPS signal. The user status information refers to whether the user is driving.

For example, the detector 120 may detect location information of the display device 100 through reception of the GPS signal, or may detect the traffic status information, the estimated arrival time information, the vehicle speed information, the weather information, or the temperature information through storing the information therein or through reception of various information from a server (not illustrated) that can search for the information. The display device 100 may be connected by wire or wirelessly to the electronic control unit 300 of the vehicle. Accordingly, the vehicle speed information may be detected through reception of related information from the vehicle.

The user status information, for example, "during driving," may be detected at a moment when a user connects the mobile device 200 to the display device 100. Specifically, the user status information may be detected in a manner such that if the vehicle speed information is less than 5 km/s after the mobile device 200 is connected to the display device, "drive standby state" may be detected, and if the vehicle speed information is more than 5 km/s, "drive state" may be detected. The above-described examples are exemplary, and the drive standby state and the drive state may be set according to various standards.

The passenger boarding information may be detected in a manner such that passengers are detected using a detection sensor provided in the vehicle and the passenger information detected by the electronic control unit 300 is transferred to the display device. Further, the passenger boarding information may be detected in a manner such that the display device 100 performs communication with terminal devices carried by the passengers. Further, the passenger boarding information may be manually input by a user and may be stored in the memory 110.

The detector 120 may detect content information that is reproduced in the display device 100. If the content is being reproduced in the mobile device 200, the mobile device may transfer the content information that is being reproduced to the display device 100. If the content is reproduced in another content reproduction device in the vehicle, the display device 100 or the mobile device 200 collects audio data of the content that is being reproduced and transfers the collected audio data to the server 400 through the mobile device 200. The server 400 searches for content information that coincides with the received audio data and transfers the searched content information to the mobile device 200. The mobile device 200 transfers the received content information to the display device 100. Through the above-described process, the display device may acquire the content information that is being reproduced in the other content reproduction device in the vehicle.

The display 130 displays a message transfer screen. The message transfer screen may include an opposite party (i.e., another party) for message transfer, a message kind selection menu, and a text to be transferred. Further, if the mobile device 200 receives a call signal, the mobile device 200 transfers the received call signal to the display device 100. The display 130 of the display device 100 may display sender information of the received call signal. The display 130 may be implemented by at least one of a liquid crystal display, a thin film transistor-liquid crystal display, an organic light emitting diode, a flexible display, and a three-dimensional (3D) display.

If the kind of message to be transferred is selected on the message transfer screen, the controller 140 automatically generates a message through combination of the template and status information, which correspond to the selected kind of the message. If a call is made, the controller 140 controls the communicator 150 to transmit the call details and the location information of the display device 100 to the mobile display 200. The controller 140 controls respective constituent elements of the display device 100 including the memory 110, the detector 120, the display 130, and the communicator 150.

The communicator 150 transfers the message to the mobile device 200. Further, the communicator 150 may transmit or receive various data with the mobile device 200, transfer a user command to the mobile device 200, receive vehicle status information from the electronic control unit 300 of the vehicle, or transfer the user command to the electronic control unit 300.

Figure 4:
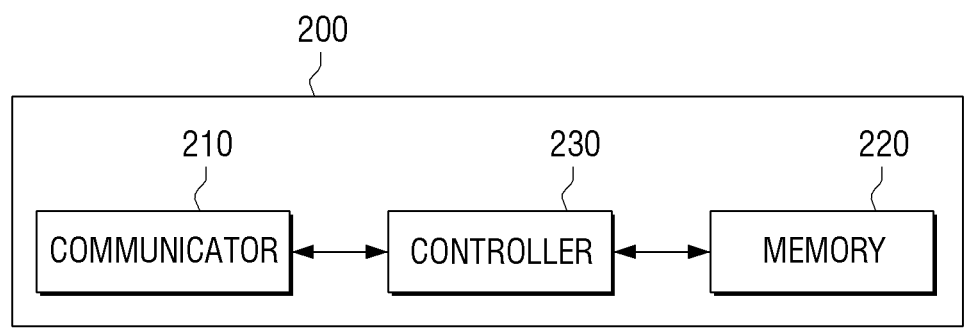
FIG. 4 is a block diagram of a mobile device according to an exemplary embodiment.

FIG. 4 is a block diagram of a mobile device 200 according to an exemplary embodiment.

Referring to FIG. 4, a mobile device 200 includes a communicator 210, a memory 220, and a controller 230.

The communicator 210 functions to connect the mobile device 200 to an external mobile device or a display device 100. The communicator 210 includes a cellular communication module (not illustrated). Accordingly, the communicator 210 can transfer and receive a voice call, a video call, or a message with the external mobile device or the server. Further, the communicator 210 may include at least one of a wireless LAN module (not illustrated) or a near field communication module (not illustrated). Further, the communicator 210 may be provided with a USB connector to be connected to the display device 100 through a USB cable.

Accordingly, the communicator 210 can transfer and receive data with the display device 100. For example, the communicator 210 receives a message from the external mobile device. The communicator 210 transfers the received message to the display device 100 under the control of the controller 230. The transfer of the received message may be performed according to a message transfer request command included in a predetermined application of the display device 100 if the application is executed. Further, if the mobile device 200 and the display device 100 are connected to each other, the mobile device 200 may be set so as to automatically transfer the message or the call received through the mobile device 200 to the display device 100.

Further, the communicator 210 receives the message, receiver information to receive the generated message, and the message transfer command from the display device. The message received from the display device 100 is transferred to a receiver according to the transfer command.

The memory 220 functions to store various programs required to drive the mobile device 200 and data. The memory 220 may store the message received from the external mobile device, and temporarily store the generated message that is received from the display device 100. Further, the memory 220 may store inherent information and setting information of the display device 100 and the mobile device 200. For example, the memory may include a ROM, a RAM, or a memory card (e.g., an SD card or a memory stick) that can be detachably mounted in the mobile device 200. Further, the memory may include a nonvolatile memory and a volatile memory.

The controller 230 controls the communicator 210 to transfer a call or a message received from an external device to the display device 100 and to receive the generated message from the display device 100. Further, if a user command input to the display device 100 is received through the communicator 210, the controller 230 performs the corresponding control operation.

Up to now, the display device 100 and the mobile device 200 have been described using the block diagrams. Hereinafter, a method for generating a message in the display device 100 will be described.

Figure 5:
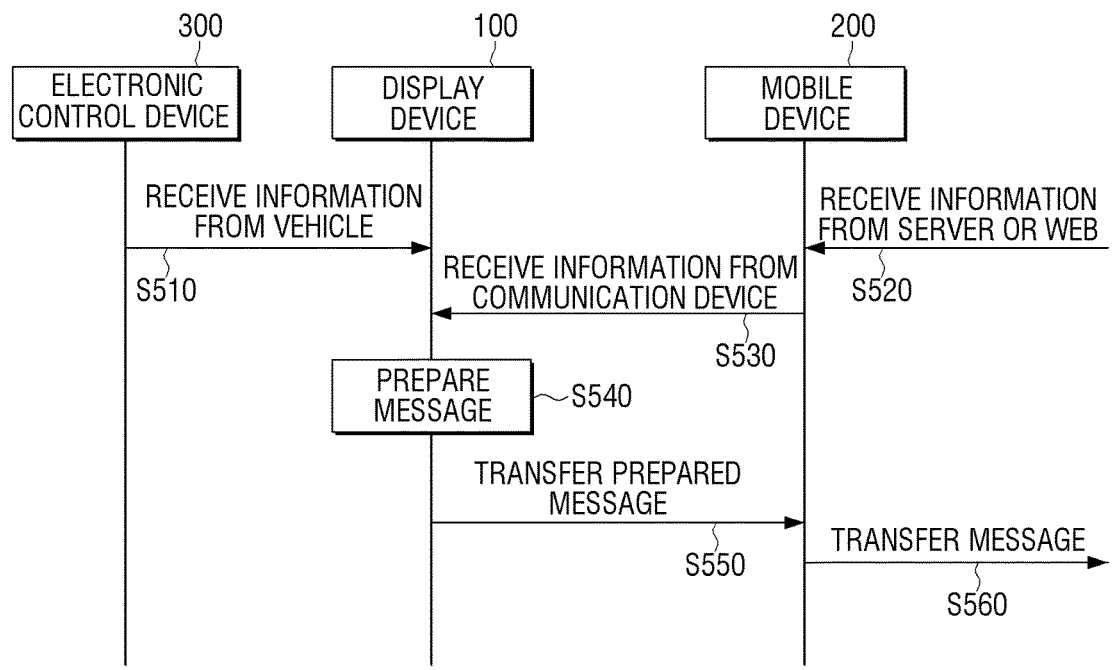
FIG. 5 is a timing chart illustrating a method for receiving current status information from a vehicle and a server and generating a message.

FIG. 5 is a timing chart illustrating a method for receiving current status information from a vehicle and a server and generating a message according to an exemplary embodiment.

Referring to FIG. 5, the display device 100 receives vehicle information from the electronic control unit 300 of the vehicle (S510). For example, the information received from the electronic control unit 300 of the vehicle may be vehicle speed information, vehicle outdoor temperature information, vehicle indoor temperature information, and location information. The temperature information may be detected by a sensor mounted on the vehicle and may be transferred to the display device 100 through the electronic control unit 300. The speed information may be detected by a sensor mounted on the vehicle or may be indirectly acquired from the information on the engine revolution measured for engine control and the degree of opening of an accelerator. If a GPS module is mounted on the vehicle, the vehicle location information received from the mounted GPS module may be transferred to the display device 100. In the present exemplary embodiment, the display device 100 may be built in the vehicle, or may be detachably mounted on the vehicle. In an exemplary embodiment, it is assumed that the display device 100 is attached to the vehicle, and in consideration of the error range of the GPS signal, vehicle location information, location information of the display device 100, and the location information of the mobile device 200 are considered to be the same.

The display device 100 may connect to the electronic control unit 300 using a CAN communication method, and all information measured and detected through the electronic control unit 300 can be automatically transferred to the display device 100. The display device 100 may store various vehicle information received from the vehicle, and may display the received information through the display.

The mobile device 200 receives various kinds of information from the server 400 or the web. For example, the various kinds of information may include location information of the mobile device 200, traffic information, and weather information. If the mobile device 200 includes the GPS module (not illustrated), the mobile device 200 may receive the location information of the mobile device 200 through the GPS module. As described above, the location information of the mobile device 200, the vehicle location information, and the location information of the display device 100 are considered to be the same. The traffic information and the weather information may be received from the server 400 or the web. Further, in the case where the content is reproduced in another content reproduction device in the vehicle, the mobile device 200 may transfer the audio data of the content being reproduced to the server 400. The server 400 may search for the content information using the received audio data, and then may transfer the searched content information to the mobile device 200.

The mobile device 200 transmits the received information to the display device 100 (S530). As described above, the various kinds of information may include the location information of the mobile device 200, the traffic information, and the weather information. On the other hand, if the mobile device 200 has map data and navigator function, the mobile device 200 can acquire the estimated arrival time information from the stored map data and navigation application. If the content is reproduced in the mobile device 200, the mobile device 200 can acquire the content information being reproduced. As described above, the mobile device 200 may transfer not only the information received from the server 400 or the web, but also the information acquired by the mobile device 200 to the display device 100. The information to be transferred from the mobile device 200 to the display device 100 may be requested from the mobile device 200 through the display device 100. The detector 120 of the display device 100 detects the kind and status of the information from the received information. The detected information is stored in the memory 110.

Alternatively, at least one of the vehicle location information, the estimated arrival time information, and the content information being reproduced may be acquired by the display device 100. For example, if the display device 100 includes the GPS module (not illustrated), the vehicle location information can be directly acquired from the display device 100. If the display device 100 can perform map data and navigation function, the display device 100 can directly acquire the estimated arrival time information. In the case of the content being reproduced in the display device 100, the display device 100 can directly acquire the content information. If the display device 100, the mobile device 200, and the electronic control unit 300 acquire plural pieces of the same information, the display device 100 may not request the corresponding information from the mobile device 200 or the electronic control unit 300. Further, if the display device 100 acquires plural pieces of the same information, the display device 100 may store only one piece of information in the order of their determined priorities.

The display device 100 prepares a message (S540). The display device 100 stores the information received from the mobile device 200 and the electronic control unit 300 of the vehicle. The mobile device 200 or the electronic control unit 300 of the vehicle may automatically transfer the various kinds of information to the display device 100 at a predetermined time or at a time when a specific event occurs. For example, if the vehicle indoor temperature information is changed after the electronic control unit 300 transfers the vehicle indoor temperature information to the display device 100, the electronic control unit 300 may automatically transfer the changed vehicle indoor temperature information to the display device 100. Further, if the estimated arrival time information is changed, the mobile device 200 may automatically transfer the changed estimated arrival time information to the display device 200. Further, the mobile device 200 or the electronic control unit 300 may transfer the information at predetermined intervals, for example, at intervals of one minute or five minutes, and the display device 100 may periodically request the information transfer from the mobile device 200 or the electronic control unit 300. The detailed message preparation method will be described later.

The display device 100 transfers the prepared message to the mobile device 200. If the display device 100 receives a message preparation completion command or a message transfer command, it transfers the prepared message to the mobile device 200. The mobile device 200 transmits the message received from the display device 100 to the external mobile device (S560).

FIG. 6 is a diagram illustrating current status information detected by the display device 100 according to an exemplary embodiment.

Referring to FIG. 6, different pieces of status information 10 that correspond to the kinds of messages are illustrated. The plural pieces of status information 10 may be detected by the detector 120 and may be stored in the memory 110. According to circumstances, the plural pieces of status information 10 detected and stored may be displayed on the display 130 according to a status information viewing menu.

The plural pieces of status information may be received from the mobile device 200 or the electronic control unit 300. Further, the status information may be acquired from the display device 100. That is, the vehicle location information may be acquired from the display device 100, the mobile device 200, or the electronic control module 300 depending on whether the devices include the GPS module (not illustrated). The traffic information and the weather information may be transferred from the mobile device 200 to the display device 100. The estimated arrival time information and the content information being reproduced may be transferred from the mobile device 200 or may be acquired by the display device 300. The speed information and the temperature information may be transferred from the electronic control unit 300 to the display device 100. The various kinds of information transferred to the display device 100 may be detected for status information by the detector 120, and may be stored in the memory 110.

As an example, and as illustrated in FIG. 6, the user location information may be detected as follows and stored.

User location is Kangnam Station, vehicle speed is 60 km, weather is cloudy, song being reproduced is Doremi song, estimated arrival time is 06:00 PM, and current temperature is 14° C. The status information illustrated in FIG. 6 is exemplary, and other status information may be detected and stored.

If a user selects one of the message kind menus, the controller 140 selects the corresponding status information among the stored plural pieces of status information 10, combines the selected status information with the predetermined template, and generates a completed sentence.

FIG. 7 shows diagrams illustrating a message transfer/reception process according to an exemplary embodiment.

Referring to (a) of FIG. 7, the display device 100 is connected to the mobile device 200. The display device 100 reproduces music A while performing a navigation function. The mobile device 200 receives a message. If the message is received, the mobile device 200 transfers the received message to the display device 100. The mobile device 200 transfers a sender name that sent the message, a sender phone number, a sender photograph, and message contents to the display device 100.

Referring to (b) of FIG. 7, the display device 100 receives the message from the mobile device 200 and displays the received message on the screen. As an example, the display device 100 may divide the screen into two areas, and display the message contents on an upper divided area 21 and sender information, such as sender name, sender phone number, and sender photograph, on a lower divided area 22.

The lower area 22 of the display 130 may be set as a menu area for making a call to the sender or sending a response message. Accordingly, if the user taps the lower area 22, the screen may be changed to a screen for making a call to the sender or preparing a response message. The details of the message preparation will be described later. If the message preparation is completed and a transfer menu is selected, the display device 100 transfers the generated message and a message transfer command to the mobile device 200.

Referring to (c) of FIG. 7, the message transfer menu has been selected, and the display device 100 has transferred the generated message and the message transfer command to the mobile device 200. After transferring the message transfer command, the display device 100 returns to the state the display device 100 was at before the message was received. That is, the display device 100 displays the reproduction state of the music A on the screen while performing the navigation function. If a message is received, the display device 100 may stop the content being reproduced or continue the reproduction. Whether to continue or stop the content reproduction during the message reception may be set by a user's setting.

The mobile device 200 transfers the generated message according to the message transfer command. If needed, the mobile device 200 may temporarily store the generated message in the memory 220, and if the message transfer is successful, the mobile device 200 may delete the temporarily stored message. If the message transfer fails, the mobile device 200 may transfer the result of failure to the display device 100 so as to enquire whether to attempt to retransfer the message. At this time, the display device 100 may display the prepared message with predetermined warning sound and display retransfer selection menu.

Hereinafter, the method for preparing a message will be described in further detail.

FIG. 8 and FIG. 9 show diagrams illustrating a message generation process in the display device 100 according to an exemplary embodiment.

Referring to (a) of FIG. 8, the display 130 of the display device 100 may display two areas. A navigation screen and a content screen being reproduced may be displayed on the upper area 21, and the opposite party for message transfer and a new message preparation button may be displayed on the lower area 22. If the user selects the new message preparation button that is displayed on the lower area 22, the screen is changed. (a) of FIG. 8 is merely exemplary. If the user taps the sender information in a state where the sender information of the received message is displayed on the lower area 22, a call connection or message preparation selection menu may be displayed.

Referring to (b) of FIG. 8, the display 130 displays the change screen. The opposite party and a call button may be displayed on the upper area 21, and a message preparation window and a message kind selection button 51 may be displayed on the lower area 22. If the user selects a call button, the display device 100 attempts a call connection with the opposite party displayed on the upper area 21. If the user prepares the message on the message preparation window and selects the transfer button, the prepared message is transferred to the opposite party. If the user selects the message kind selection button 51, the screen may be changed to a screen on which an icon for selecting the predetermined message kind is displayed.

Referring to (c) of FIG. 8, the screen 23, on which a simple message transfer menu is displayed, is displayed. The screen 23, on which the simple message transfer menu is displayed, includes the opposite party and a predetermined message kind selection icon. The predetermined message kind selection icon may include a location information transfer icon 53, a traffic status information transfer icon 55, an estimated arrival time information transfer icon 57, a weather information transfer icon 59, and a reproduced content information transfer icon 61. If the user selects the location information transfer icon 53, the controller 140 generates a sentence through combination of the predetermined template with the status information detected by the detector 120.

Referring to (a) of FIG. 9, a screen that displays the generated sentence is illustrated. For example, it is assumed that the memory 110 stores a template "I'm passing" to correspond to the location information transfer message, and the detector 120 detects location information "XXX Street." In this case, corresponding to the user's selection of the location information transfer icon 53, the controller 140 extracts and combines "I'm passing" and "XXX Street." The display 130 displays the combined information "I'm passing XXX Street." The user may additionally select another message. For example, the user may also select the traffic status information transfer icon 55.

Referring to (b) of FIG. 9, a screen that the display 130 displays to correspond to the user's selection is illustrated. For example, it is assumed that the memory 110 stores a template "The traffic is" to correspond to the traffic status information transfer message, and the detector 120 detects the traffic status information "Heavy." In this case, corresponding to the user's selection of the traffic status information transfer icon 55, the controller 140 extracts and combines "The traffic is" and "Heavy." The display 130 displays the combined information "The traffic is Heavy." The user may additionally select the estimated arrival time information transfer icon 57.

Referring to (c) of FIG. 9, a screen that the display 130 displays to correspond to the user's selection is illustrated. For example, it is assumed that the memory 110 stores a template "I'll be there" to correspond to the estimated arrival time information transfer message, and the detector 120 detects the estimated arrival time information "around PM 06:00." In this case, corresponding to the user's selection of the estimated arrival time information transfer icon 57, the controller 140 extracts and combines "I'll be there" and "around PM 06:00." The display 130 displays the combined information "I'll be there around PM 06:00." The user may prepare messages as many as the predetermined kinds of messages. If the user selects the transfer button 63, the combined sentence that is displayed on the display 130 is transferred to the opposite party.

Referring to FIGS. 8 and 9, the kinds of messages including the location information transfer message, the traffic status information transfer message, the estimated arrival time information transfer message, the weather information transfer message, and the reproduced content information transfer message have been described. However, the kinds of messages can be edited by the user.

FIG. 10 shows diagrams illustrating a process of editing a message kind menu according to an exemplary embodiment.

Referring to (a) of FIG. 10, the display 130 may display an edition screen 33 of a message menu. The user can select message menu edition 65.

Referring to (b) of FIG. 10, the display 130 may display the screen that is divided into two areas. An existing message kind selection and deletion menu may be displayed on the upper area 21, and a new message kind selection and addition menu may be displayed on the lower area 22. The user may select a reproduced content information transfer icon 61 and may select a deletion icon 67. Further, the user may select a vehicle speed information transfer icon 69 and may select an addition button 73. The icon deletion and addition operation may be performed as separate operations, or may be simultaneously performed. If the operations are simultaneously performed, as illustrated in (b) of FIG. 10, the display device 100 displays the deletion button 67, the addition button 73, and a completion button (not illustrated), and if the user selects the completion button, the icon deletion and addition can be simultaneously performed. Further, the deletion button 67 and the addition button 73 may not be displayed, but only the completion button (not illustrated) may be displayed. In this case, if the user selects the completion button, the deletion of the predetermined icon and the addition of an icon that has not been determined may be simultaneously performed.

Referring to (c) of FIG. 10, the display 130 displays a newly edited message kind menu screen. That is, a message kind menu screen may be displayed, on which the deleted reproduced content information transfer icon 61 among the existing message kind menu selection icon is not displayed, but newly added vehicle speed information transfer icon 69 is included. If the user selects the added vehicle speed information transfer icon 69, the display device 100 performs the same process as that illustrated in FIGS. 8 and 9. Examples of new message kinds may be vehicle speed information, vehicle outdoor temperature, vehicle indoor temperature, user status information, and passenger boarding information.

Referring to FIG. 10, the process of editing a message kind menu has been described. However, the templates stored to correspond to the kinds of messages can also be edited and updated. For example, the user may select a stored template edition button, and edit "I'm passing" that is stored to correspond to the location information to "Here is."

Figure 11:
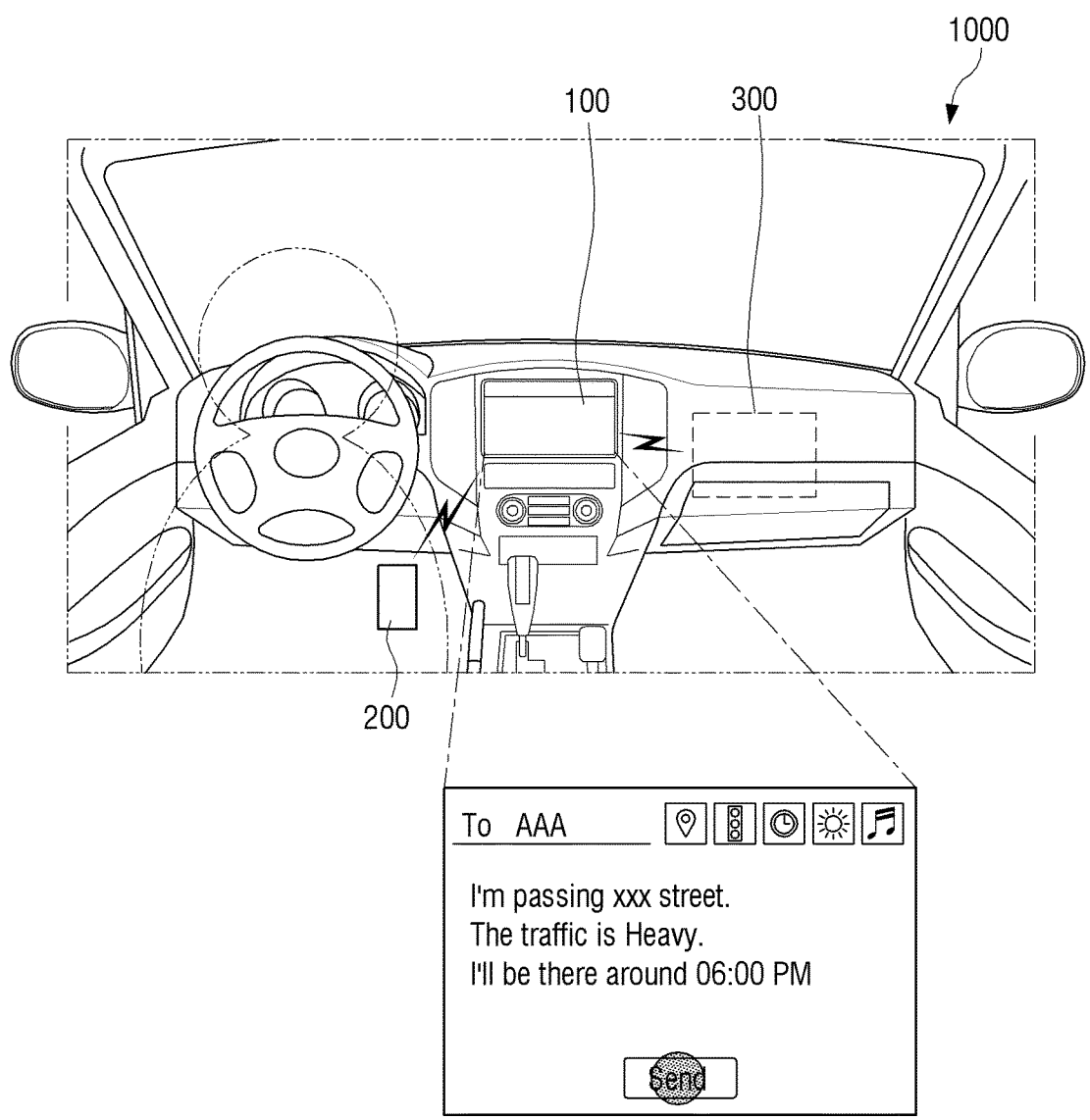
FIG. 11 is a diagram illustrating a use example of a mobile device and a display device connected to a vehicle according to an exemplary embodiment.

FIG. 11 is a diagram illustrating a use example of a mobile device and a display device connected to a vehicle according to an exemplary embodiment.

FIG. 11 illustrates the state where the display device 100, the mobile device 200, and the electronic control unit 300 are connected in the wireless communication method in the vehicle. The display device 100 and the mobile device 200 may be connected by wire, and the display device 100 and the electronic control unit 300 may be connected by wire. FIG. 11 illustrates a case where the display device 100 is built in the vehicle. However, the display device 100 may be independently provided, and may be detachably mounted on the vehicle.

If the display device 100 and the mobile device 200 are connected as shown in FIG. 11, the mobile device 200 transfers the received call, message, or data to the display device 100. If the display device 100 is connected, the electronic control unit 300 transfers the vehicle-related information to the display device 100. The display device 100 may display various kinds of data received from the mobile device 200 or the electronic control unit 300.

The display device 100, the mobile device 200, or the electronic control unit 300 obtains the vehicle location using the GPS chip provided therein. That is, the location of the display device 100, the location of the mobile device 200, and the location of the electronic control unit 300 may be considered the same as the location of the vehicle.

The user may select a simple message preparation menu with respect to the received message, and prepare a message through selection of the kind of the message to be transferred. For example, if the location, traffic status, and the estimated arrival time are selected, the corresponding templates and the detection information are combined to generate a sentence. If the user selects a transfer button, the generated message is transferred to the opposite party.

FIG. 11 exemplarily illustrates that the driver's mobile device 200 and the display device 100 are connected. However, in the case where a plurality of passengers carry respective mobile devices, the display device 100 may connect the plurality of mobile devices to the display device 100 using the near field communication method. In this case, if the display device 100 receives advertisement information, the display device 100 may transmit the advertisement information to the plurality of mobile devices.

In order to perform operations according to various embodiments, the display device 100 may include other constituent elements in addition to the constituent elements as described above with reference to FIG. 3.

Figure 12:
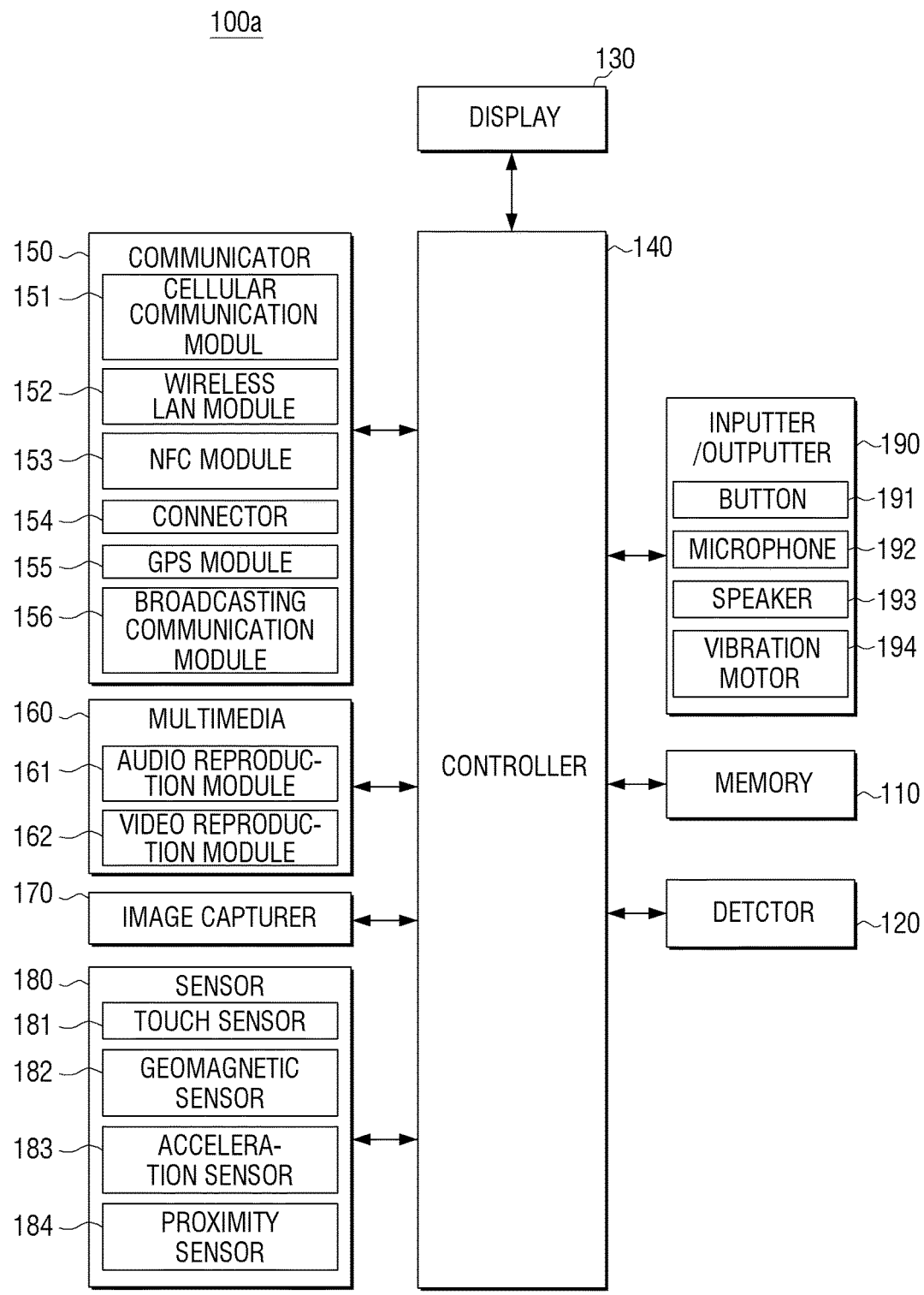
FIG. 12 is a block diagram illustrating the configuration of a display device according to an aspect of another exemplary.

FIG. 12 is a block diagram illustrating the configuration of a display device according to another exemplary embodiment.

Referring to FIG. 12, a display device 100a includes a memory 110, a detector 120, a display 130, a controller 140, a communicator 150, a multimedia unit 160, an image capturer 170, a sensor 180, and an input/output unit 190.

The memory 110 stores various kinds of multimedia data processed by the controller 140, content data, and data received from an external source.

The memory 110 may store control programs for a control operation of the controller 140 and applications. Hereinafter, the term "memory" may refer to a ROM, a RAM, or a memory card (e.g., an SD card or a memory stick) that can be detachably mounted in the display device 100a. Further, the memory may include a nonvolatile memory, a volatile memory, a hard disk drive (HDD), or a solid state drive (SSD).

The memory 110 stores a plurality of templates differently set by the kinds of messages. Further, if a call is made in the display device 100a, the memory 110 may store call details to be transferred to the server 400.

The detector 120 detects different pieces of status information. The detector 120 may receive various kinds of information from a GPS module 155, the electronic control unit 300 of the vehicle, or the server 400.

The display 130 displays multimedia content, images, moving images, and texts under the control of the controller 140. The display 130 may be implemented by a general display panel that does not have a touch input function, or may be implemented by a touch display panel that can recognize a user operation using a proximity sensor or a touch sensor. In the case where the display is implemented by the touch display panel, it may receive at least one touch gesture through a user's body (e.g., fingers including a thumb) or any suitable input means (e.g., stylus pen).

The user interface may include a predetermined touch area, soft key, and a soft menu. The display 130 may transfer an electronic signal that corresponds to at least one touch gesture input through the user interface to the display 130 through an LCD controller (not illustrated). Further, the display 130 may detect continuous movement of the touch, and may transfer an electronic signal that corresponds to continuous or discontinuous movement of the touch to the LCD controller.

The display 130 may be implemented by, for example, a resistive type, a capacitive type, an infrared type, or an acoustic wave type display.

The display 130 converts a sensing signal according to a user's operation, which is detected through the touch sensor, into a digital signal (e.g., X and Y coordinates), and transfers the digital signal to the controller 140. The controller 140 may perform a control operation that corresponds to a user's operation that is input through the display 130 using the received digital signal. For example, the controller 140 may operate to select a soft key that is displayed on the display 130 in response to the user's operation, or may execute an application that corresponds to the soft key.

The above-described user gesture is not limited to a direct contact between the display 130 and a user's body or a touchable input means, but includes non-contact type. The sensitivity of the user's operation that can be detected through the display 130 may be changed in accordance with the performance or the structure of the display device 100a.

The controller 140 includes a CPU, a ROM (Read Only Memory) for storing control programs for controlling the display device 100a, and a RAM (Random Access Memory) which stores signals or data input from outside of the display device 100a or is used as a storage area for work performed in the display device 100a. The CPU may include at least one of single-core processor, a dual-core processor, a triple-core processor, and a quad-core processor. The CPU, the ROM, and the RAM are connected to each other through an internal bus.

The controller 140 controls the memory 110, the detector 120, the display 130, the communicator 150, the multimedia unit 160, an image capturer 170, and the sensor 180.

The communicator 150 includes a cellular communication module 151, a wireless LAN module 152, a near field communication module 153, a connector 154, a GPS module 155, and a broadcasting communication module 156.

The cellular communication module 151 makes the display device 100a connect to an external device (particularly, base station of a cellular system) through at least one or a plurality of antennas (not illustrated) using a wireless access technology according to a cellular communication protocol under the control of the controller 140.

Further, the cellular communication module 151 transmits/receives a wireless signal that contains a voice call, a video call, a SMS (Short Message Service) message, or a multimedia (multimedia messaging service: MMS) message with a mobile phone having phone numbers input to the display device 100*a*, a smart phone, a tablet PC, or other communicable devices.

The wireless LAN module 152 may be connected to the Internet, in a place where a wireless AP (Access Point) (not illustrated) is installed, under the control of the controller 140. The wireless LAN module 152 supports IEEE wireless LAN standards (IEEE802.11x).

The near field communication module 153 can perform NFC communication between the display device 100*a* and the external device. The NFC communication method may include a Bluetooth™, infrared communication (IrDA), and NFC.

The connector 154 provides an interface with various devices, such as USB 2.0, USB 3.0, HDMI, and IEEE 1394. The connector 154 may be used as an interface for connecting the display device 100*a* to an external device or a power source. Under the control of the controller 140, the data stored in the memory of the display device 100*a* may be transferred to an external device through a wired cable connected to the connector 154, or the data may be received from the external device. The power may be input from a power source through a wired cable connected to the connector 154. The power input may be a rechargeable battery (not illustrated).

The GPS module 155 may receive radio waves from a plurality of GPS satellites (not illustrated) on orbits around the earth, and may calculate the location of the display device 100*a* using the time of arrival from the GPS satellites (not illustrated) to the display device 100*a* and GPS parameters.

The broadcasting communication module 156 may receive a broadcasting signal (e.g., TV broadcasting signal, a radio broadcasting signal, or data broadcasting signal) and broadcasting additional information (e.g., EPS (Electric Program Guide) or ESG (Electric Service Guide)) which are output from a broadcasting station through a broadcasting communication antenna (not illustrated) under the control of the controller 140.

The multimedia unit 160 includes an audio reproduction module 161 and a video reproduction module 162. The audio reproduction module 161 can reproduce a digital audio file (e.g., file having a file extension, such as mp3, wma, ogg, or way) that is stored or received under the control of the controller 140. The video reproduction module 162 supports various types of codecs to reproduce a digital video file. That is, the video reproduction module 162 reproduces a video file by a codec that is pre-stored to match a codec type of a video file to be reproduced. Further, the audio reproduction module 161 or the video reproduction module 162 of the multimedia unit 160 may be included in the controller 140.

The image capturer 170 captures a still image or moving image under the control of the controller 140. The image capturer 170 may include a plurality of cameras. The image capturer 170 may include an auxiliary light source (e.g., flash (not illustrated)) that provides the quantity of light required for capturing images.

The image capturer 170 transfers the captured image to the controller 140. The controller 140 may detect user's motion or shape through analysis of an image, and may perform control operation corresponding to the detected motion or shape. As an example, the user's motion refers to a motion of the user's hand detected through the image capturer 170. The user's shape refers to a user's face shape that is detected through the image capturer 170.

In an exemplary embodiment, the display device 100*a* may detect the user's motion using a different means such as an infrared sensor, and execute or control the application in response to the motion.

The image capturer 170 may be configured separately from the display device 100*a*. For example, the display device 100*a* may be mounted inside the vehicle, and the image capturer 170 may be mounted on the outside (e.g., front surface or rear surface) of the vehicle. The display device 100*a* and the image capturer 170 may be connected by wire or wirelessly, and images of the front surface or rear surface of the vehicle, which are captured by the image capturer 170, may be displayed on the display device 100*a*.

The sensor 180 may include at least one of a touch sensor 181, a geomagnetic sensor 182, an acceleration sensor 183, a hinge sensor 184, and a proximity sensor 185.

The touch sensor 181 is a sensor that can detect a user's touch on the display device 130. The touch sensor 181 may be divided into an electrostatic type and a piezoelectric type according to the method for detecting the user's touch. The touch sensor 181 may be implemented by the two types of sensors. Touch sensor 181 may constitute the display together with the display panel.

The touch sensor 181 refers to a sensor that can input instructions displayed on the display screen by pressing the touch screen with a body, such as a finger, or any suitable input means. The touch sensor 181 may use capacitance change, resistance change, or light quantity change to detect a touch.

The geomagnetic sensor 182 may detect an azimuth angle through detection of geomagnetism. Accordingly, the geomagnetic sensor 182 recognizes the direction of the display device 100*a*. The acceleration sensor 183 measures dynamic force, such as acceleration, vibration, or impact of an object through processing of an output signal, and detects a change in the moving speed of the display device 100*a* or the strength of force. The proximity sensor 184 may detect the proximity of an object with respect to the user's display device 100*a*.

Although not illustrated in FIG. 12, the sensor 180 of the display device 100*a* may further include at least one of a gravity sensor for detecting which direction the gravity acts, a gyro sensor that can recognize six axes in total through putting rotation to the existing acceleration sensor, an orientation sensor that can automatically rotate or arrange the content through automatic detection of the horizontal or vertical frames of the content, such as an image, an illumination sensor detecting the quantity of light in the vicinity of the display device 100*a*, an altitude measurement sensor measuring atmospheric pressure, an RGB sensor detecting colors of an object, a distance measuring sensor for measuring a distance using ultrasound or infrared rays, and a hall effect sensor outputting a variable output voltage according to the strength of the magnetic field.

The respective sensors of the sensor 180 may detect the state, generate and transfer a signal corresponding to the detection to the controller 140. The sensors of the sensor 180 may be added or deleted depending on the performance of the display device 100*a*.

The input/output unit 190 includes a buttons 190, a microphone 192, a speaker 193, and a vibration motor 194.

The at least one button 191 may be formed on a front surface, a side surface, or a rear surface of the body of the display device 100*a*, and may be of a push type or a touch type. The buttons 191 may include at least one of a power/locking button, a volume control button, a menu button, a home button, a back button, and search button.

The microphone 192 receives voice or sound and generates an electrical signal under the control of the controller 140.

The speaker 193 may output sound that corresponds to various signals (e.g., a wireless signal, a broadcasting signal, a digital audio file, a digital moving image file or photographing) of the cellular communication module 151, a wireless LAN module 152, a near field communication module 153, a multimedia unit 160, or an image capturer 170, to outside under the control of the control unit 140.

The speaker 193 may output sound (button operation sound corresponding to a phone call or call connection sound) corresponding to the functions performed by the display device 100*a*. One or a plurality of speakers 193 may be formed at appropriate positions or positions of the body of the display device 100*a*. As an example, the speaker 193 may include an inner speaker module which is arranged at a position suitable to approach the user's ear during a call and an outer speaker module which is arranged at a suitable position of the body of the display device 100*a* having higher output suitable to be used during reproduction of audio/video file or viewing a broadcast.

A vibration motor 194 may convert an electrical signal into mechanical vibration under the control of the controller 140. For example, if a voice call is received from another device (not illustrated), the display device 100*a* that is in a vibration mode operates the vibration motor 194. One or a plurality of vibration motors 194 may be formed in a body of the display device 100*a*. The vibration motor 194 may operate in response to a user's touch gesture that is sensed on the display 130 and a continuous movement of the touch that is sensed on the display 130.

A power supply (not illustrated) supplies power that is used in the display device 100*a*. The power supply may be implemented by a rechargeable battery, and may further include a voltage converter which converts an external power supply and supplies the converted power to the rechargeable battery.

The power supply may supply the power according to power management control in various modes, such as a maximum performance mode, a normal mode, a power saving mode, and a standby mode.

The display device 100*a* may transfer call details and location information of the display device 100*a* to the server 400.

The above-described display device 100*a* may not include all the constituent elements, but may include only parts of the constituent elements according to exemplary embodiments. Further, if the display device 100*a* includes the cellular communication module 151, functions that are described as being performed by the mobile device 200 may be performed in the display device 100*a*.

Hereinafter, a method for the display device 100*a* to generate and transfer a message without the mobile device 200 will be described.

Figure 13:
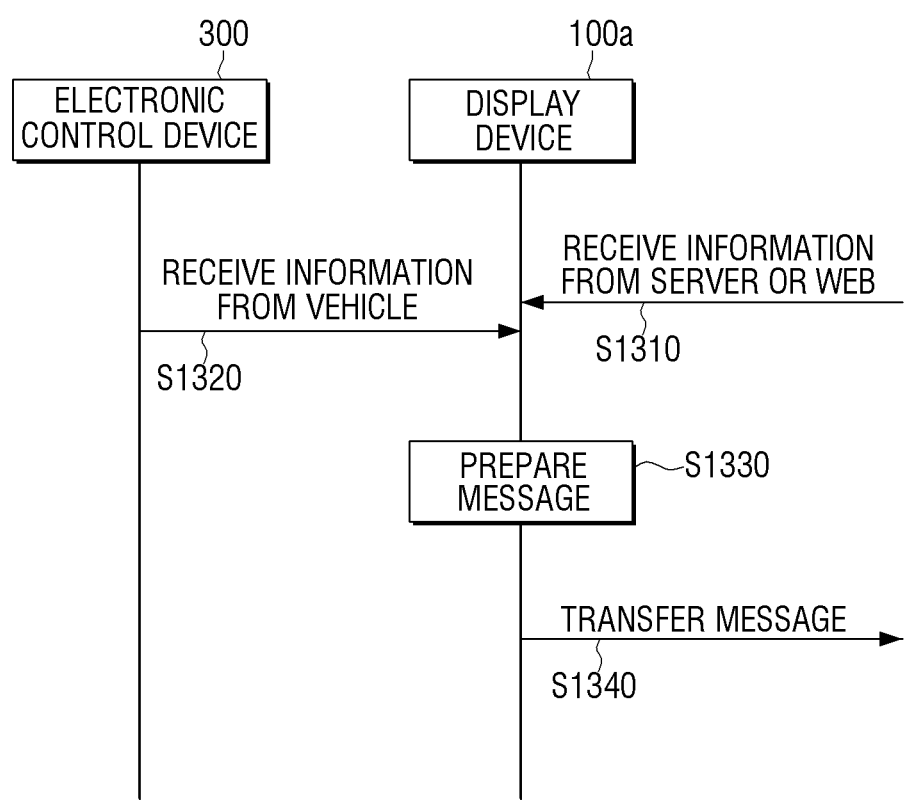
FIG. 13 is a timing chart illustrating a method for receiving current status information and generating a message according to an aspect of another exemplary embodiment.

FIG. 13 is a timing chart illustrating a method for receiving current status information and generating a message according to another exemplary embodiment. The display device 100*a* explained with reference to FIG. 13 may include a cellular communication module 151 and transfer/receive a call and a message.

Referring to FIG. 13, the display device 100*a* receives various kinds of information from the server 400 or the web. For example, the various kinds of information may be location information of the display device 100*a*, traffic information, or weather information. As described above, it is considered that the location information of the display device 100*a* and the location information of the vehicle are the same. Further, in the case of reproducing content in another content reproduction device in the vehicle, the display device 100*a* may transfer audio data of the content being reproduced to the server 400 to request a search, and receive content information from the server 400.

The display device 100*a* receives vehicle information from the electronic control unit 300 of the vehicle (S1320). For example, information that is received from the electronic control unit 300 of the vehicle may be vehicle speed information or vehicle temperature information. The display device 100*a* may store various kinds of vehicle information received from the vehicle, and display the vehicle information through the display.

The display device 100*a* prepares a message (S1330). The detector 120 of the display device 100*a* determines which status information is provided from the received various kinds of information, and detects the corresponding status information. The display device 100*a* stores the status information detected from the mobile device 200 and the electronic control unit 300 of the vehicle. The various kinds of information may be automatically transferred to the display device 100*a* at a predetermined time or at a time when a specific event occurs. The message is generated through combination of the stored status information corresponding to the selected status information menu and the pre-stored template.

The display device 100*a* transfers the prepared message to the external mobile device (S1340). If the display device 100*a* receives the message preparation completion command or the message transfer command, the display device 100*a* transfers the generated message to the external mobile device. That is, the display device 100*a* may be directly connected to the external device or the server 400. Further, the display device 100*a* may be connected to the electronic control unit 300 using the CAN communication method, and all information measured and detected in the electronic control unit 300 may be automatically transferred to the display device 100*a*. For this, a more detailed explanation will be made hereinafter.

Figure 14:
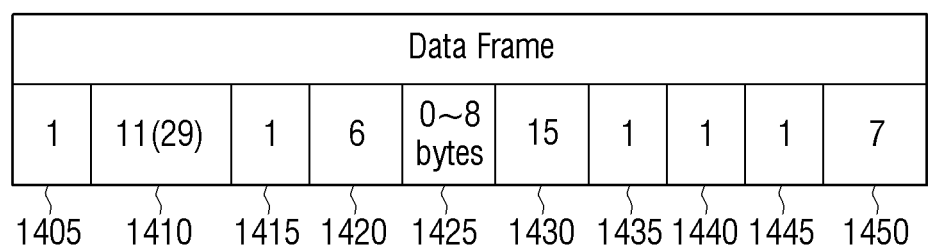
FIG. 14 is a diagram illustrating a data frame format of Controller Area Network (CAN) according to an exemplary embodiment.

FIG. 14 is a diagram illustrating a data frame format of CAN (Controller Area Network) according to an exemplary embodiment.

The CAN refers to a vehicle network system for providing digital serial communication between various kinds of measurement control equipment. By replacing the complicated electrical wirings and relays of the electronic components in the vehicle by serial communication lines with intelligence, the weight and the complexity can be reduced. Further, an abnormality which may occur due to an electronic interference can be diagnosed.

The CAN is the standard of multiple master broadcast serial buses for connecting the electronic control unit. Respective nodes can send and receive a message with each other, but are unable to simultaneously send and receive the message. The message is composed of an ID that indicates a priority of the message of 8 bytes at maximum. The devices connected to the CAN normally include a sensor, an actuator, and other control devices. The devices are not directly connected to the bus, but are connected through a host processor and a CAN controller.

Like other network protocols, the CAN protocol includes a physical layer, a transfer layer, an object layer, and an application layer. The CAN may be set with two different message (or frame) formats. A normal frame supports an identifier of 11 bits, and an extension frame supports an identifier of 29 bits.

Referring to FIG. 14, the CAN data frame format includes one-bit start of time field 1405, 11-bit or 29-bit identifier field 1410, one-bit remote transmission request (RTR) field 1415, 6-bit control field 1420, 0-8-byte data field 1425, 15-bit cyclic redundancy checking (CRC) field 1430, one-bit ACK delimiter field 1445, and 7-bit end of frame field 1450.

The start of frame field 1405 indicates the start of frame transfer. The identifier field 1410 is for data that expresses a message priority, and in the case where two nodes simultaneously transfer messages, the transfer order is determined according to the priority of the identifier field 1410. If the RTR field 1415 is 0, it means dominant in the data frame, and if the RTR field 1415 is 1, it means recessive in a remote frame. The remote frame is a frame that is output when the receiver requests data from the transmitter.

The control field 1420 includes one-bit identifier extension bit (IDE) field, one-bit reserved bit field, and four-bit data length code field. The data field 1425 includes data to be transferred. The CRC field 1430 checks error through division of bits of a predetermined section. If ACK slot 1440 is 1, the transmitter sends recessive.

The CRC delimiter field 1435, the ACK delimiter field 1445, and an end of frame field 1450 must be 1 in recessive state.

As described above, communication between the electronic control units becomes possible using the CAN, and the vehicle status information may be transferred to the display device 100a, such as a head unit (H/U) of the vehicle.

FIG. 15 is a flowchart of a message transfer method of the display device 100a or 100 according to an exemplary embodiment.

The display device detects different pieces of status information (S1510). The plural pieces of status information may be location information of the display device, traffic status information, estimated arrival time information, weather information, content information that is reproduced through the display device, current user status information, passenger boarding information, vehicle speed information, temperature information, and radio channel information that a user listens to. The detected status information may be stored in the memory.

The display device display a message transfer screen (S1520). If a message to be transferred is selected, the display device combines the corresponding template and status information (S1530). The corresponding template is pre-stored in the memory to correspond to the kinds of messages. The kinds of messages or the stored templates can be edited by the user. The display device transfers the message according to the user's transfer command (S1540).

The message transfer method of the display device according to exemplary embodiments as described above may be implemented by a program and may be provided to the display device.

As an example, a non-transitory computer readable medium, which stores a program to execute detecting different pieces of status information, displaying a message transfer screen, automatically generating a message through combination of one of a plurality of templates that are differently set by kinds of messages and stored and the status information, which respectively correspond to the selected kind of message, if the kind of message to be transferred is selected on the message transfer screen, and transferring the message to an external device, may be provided.

The non-transitory computer readable medium may be a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

While certain exemplary embodiments have been particularly shown and described, it will be understood by those skilled in the art that various changes in form and detail may be made therein without departing from the spirit and scope of the inventive concept, as defined by the appended claims.

What is claimed is:

1. A display device of a vehicle, the display device comprising:
a communicator configured to communicate with a mobile device;
a display;
a memory configured storing a plurality of templates; and
a processor configured to:
based on a message being received from the mobile device through the communicator, control the display to display the received message;
generate a response message for replying to the received message through combination of at least one of the plurality of templates corresponding to the response message and status information of the vehicle; and
control the display to display the received message and the communicator to transmit the received message to the mobile device.

2. The display device as claimed in claim 1, wherein the processor is further configured to update the plurality of templates according to a user operation.

3. The display device as claimed in claim 1, wherein kinds of the response message include at least one of a first message for notifying of location information of the display device, a second message for notifying of traffic status information, a third message for notifying of estimated arrival time information, a fourth message for notifying of weather information, and a fifth message for notifying of content information that is reproduced through the display device.

4. The display device as claimed in claim 1, wherein the status information of the vehicle includes at least one of location information of the display device, traffic status information, estimated arrival time information, weather information, and content information that is reproduced through the display device.

5. The display device as claimed in claim 1, wherein the plurality of templates are differently set according to kinds of the response message, and
wherein the processor is further configured to edit the kinds of the response message according to a user operation.

6. The display device as claimed in claim 1, wherein the processor is further configured to control the communicator to transfer call details and location information of the display device to a server when a phone call is made.

7. A message transfer method of a display device of a vehicle, comprising:
based on a message being received from a mobile device, displaying the received message on the display device of the vehicle;
generating a response message for replying to the received message through combination of at least one of a plurality of templates stored in the display device corresponding to the response message and status information of the vehicle; and displaying the received message on the display device of the vehicle and transmitting the received message to the mobile device.

8. The message transfer method as claimed in claim 7, the method further comprising updating the plurality of stored templates according to a user operation.

9. The message transfer method as claimed in claim 7, wherein kinds of the response message include at least one of a first message for notifying of location information of the display device, a second message for notifying of traffic status information, a third message for notifying of estimated arrival time information, a fourth message for notifying of weather information, and a fifth message for notifying of content information that is reproduced through the display device.

10. The message transfer method as claimed in claim 7, wherein the status information of the vehicle includes at least one of location information of the display device, traffic status information, estimated arrival time information, weather information, and content information that is reproduced through the display device.

11. The message transfer method as claimed in claim 7, wherein the plurality of templates are differently set according to kinds of the response message, and
wherein the method further comprises editing kinds of the response message according to a user operation.

12. The message transfer method as claimed in claim 7, the method further comprising transferring call details and location information of the display device to a server when a phone call is made.

13. A message transfer system including a mobile device and a display device of a vehicle, comprising:
the mobile device configured to transfer a message and sender information to the display device; and
the display device configured to display the message received from the mobile device, generate a response message for replaying to the message through combination of at least one of a plurality of templates corresponding to the response message and status information of the vehicle, and transfer the generated response message based on the sender information.

14. The display device as claimed in claim 1, wherein the status information of the vehicle includes information generated by sensors in the vehicle.

15. The display device as claimed in claim 1, wherein the display device further comprises a detector configured to detect the status information of the vehicle.

16. The display device as claimed in claim 1, wherein the status information of the vehicle includes at least two different pieces of status information of the vehicle, and
wherein the display is further configured to display at least two icons respectively corresponding to the at least two different pieces of status information of the vehicle, and
wherein, in response to a selection of one of the at least two icons, the processor is further configured to generate the response message through combination of the piece of status information of the vehicle, of the at least two different pieces of status information of the vehicle, that corresponds to the selected one of the at least two icons and at least one of the plurality of templates that corresponds to the piece of status information of the vehicle.

17. The display device as claimed in claim 1, wherein the communicator is configured to communicate with the mobile device using wireless short-range communication.

18. The display device as claimed in claim 17, wherein the wireless short-range communication is one of Bluetooth and Wi-Fi.

* * * * *